US007967980B2

(12) United States Patent
Miyachi

(10) Patent No.: US 7,967,980 B2
(45) Date of Patent: Jun. 28, 2011

(54) CONSTRUCTION MACHINE HAVING WORKING OIL TANK WITH FILTER CASE

(75) Inventor: Isao Miyachi, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 158 days.

(21) Appl. No.: 11/931,350

(22) Filed: Oct. 31, 2007

(65) Prior Publication Data

US 2008/0116208 A1 May 22, 2008

(30) Foreign Application Priority Data

Nov. 17, 2006 (JP) ................................. 2006-311719
Nov. 17, 2006 (JP) ................................. 2006-311720

(51) Int. Cl.
*B01D 35/027* (2006.01)
*B01D 35/30* (2006.01)
*B65D 8/02* (2006.01)

(52) U.S. Cl. .................... 210/172.2; 184/6.24; 210/302; 210/307; 210/308; 210/416.5; 210/455; 210/497.01; 220/4.14; 220/564

(58) Field of Classification Search .................. 210/295, 210/130–133, 167.01–167.06, 167.08, 167.09, 210/171, 172.1–172.6, 257.1, 299, 302, 307–311, 210/416.4, 416.5, 435, 437, 439, 441, 442, 210/444, 446, 451, 455, 483, 485–487, 497.01; 220/4.14, 562–564; 186/6.24; *B01D 35/02, B01D 35/04, 35/027*
See application file for complete search history.

(56) References Cited

U.S. PATENT DOCUMENTS 511,798 A * 1/1894 Rankine ........................ 210/130
745,889 A * 12/1903 McPherson ..................... 62/319
2,078,524 A * 4/1937 Ashton et al. ................. 210/357
2,098,102 A * 11/1937 Mclean ......................... 210/451
2,137,556 A * 11/1938 Young ........................... 210/442
2,262,526 A * 11/1941 Beare et al. ............... 123/196 A
(Continued)

FOREIGN PATENT DOCUMENTS

JP 7-27102 1/1995
(Continued)

*Primary Examiner* — Anthony Stashick
*Assistant Examiner* — Ned A Walker
(74) *Attorney, Agent, or Firm* — Oblon, Spivak, McClelland, Maier & Neustadt, L.L.P.

(57) ABSTRACT

A rear half part of a surface of a main body of a working oil tank installed in line with a control valve opposing to the valve is dented in an inclining surface shape in the direction moving away from the valve so that between both the tank and the valve, is formed a working space for attaching and detaching a pressure compensating spool, while return tubes are separately connected to the upper and the lower side of a filter case side wall within the body. Within the body, is provided a cylindrical filter case having a bottom in which a return filter for return oil is housed, and the return tubes are connected to the case side wall in a state of communicating with the inside of the filter case. In this configuration, a filter receiving plate is provided in a lower part within the filter case with leaving a gap between the plate and the filter case bottom wall in a state that the plate is supported by a return pipe, the return filter is disposed on the plate, and the return tubes are connected to the filter case side wall on the lower side than the plate.

3 Claims, 9 Drawing Sheets

U.S. PATENT DOCUMENTS

| | | | | | |
|---|---|---|---|---|---|
| 2,392,901 | A | * | 1/1946 | Brown | 210/416.5 |
| 2,463,800 | A | * | 3/1949 | Pate | 210/186 |
| 2,572,981 | A | * | 10/1951 | Briggs | 210/437 |
| 2,651,418 | A | * | 9/1953 | Prendergast | 210/332 |
| 2,707,563 | A | * | 5/1955 | Kasten et al. | 210/301 |
| 2,736,435 | A | * | 2/1956 | Gardes et al. | 210/282 |
| 2,767,851 | A | * | 10/1956 | Muller | 210/90 |
| 2,904,184 | A | * | 9/1959 | Daley et al. | 210/323.2 |
| 3,214,023 | A | * | 10/1965 | Donner | 210/172.2 |
| 3,319,793 | A | * | 5/1967 | Miller, Jr. et al. | 210/243 |
| 3,355,021 | A | * | 11/1967 | Jones | 210/130 |
| 3,356,218 | A | * | 12/1967 | Grudoski | 210/167.28 |
| 3,368,680 | A | * | 2/1968 | Bozek | 210/90 |
| 3,414,129 | A | * | 12/1968 | Going et al. | 210/798 |
| 3,417,015 | A | * | 12/1968 | Canevari et al. | 516/138 |
| 3,512,645 | A | * | 5/1970 | Rosaen | 210/130 |
| 3,529,722 | A | * | 9/1970 | Humbert, Jr. | 210/130 |
| 3,572,508 | A | * | 3/1971 | Rice | 210/130 |
| 3,618,776 | A | * | 11/1971 | Kudlaty | 210/130 |
| 3,653,512 | A | * | 4/1972 | Brown | 210/130 |
| 3,666,101 | A | * | 5/1972 | Rosaen | 210/90 |
| 3,747,761 | A | * | 7/1973 | Heinrich, Jr. | 210/120 |
| 3,750,888 | A | * | 8/1973 | Rinaldo | 210/172.6 |
| 3,754,648 | A | * | 8/1973 | Brown | 210/90 |
| 3,768,659 | A | * | 10/1973 | Miller | 210/313 |
| 3,819,052 | A | * | 6/1974 | Firth | 210/90 |
| 3,853,763 | A | * | 12/1974 | Hall | 210/130 |
| 3,859,216 | A | * | 1/1975 | Sisson et al. | 210/440 |
| 3,900,400 | A | * | 8/1975 | Whitfield | 210/238 |
| 3,928,201 | A | * | 12/1975 | Junck et al. | 210/132 |
| 3,959,141 | A | * | 5/1976 | Johnson | 210/132 |
| 3,970,557 | A | * | 7/1976 | Shoup | 210/130 |
| 4,052,317 | A | * | 10/1977 | Palnik | 210/323.2 |
| 4,053,409 | A | * | 10/1977 | Kuhfuss, Jr. | 210/130 |
| 4,053,410 | A | * | 10/1977 | Lorimor | 210/132 |
| 4,167,483 | A | * | 9/1979 | Rosaen et al. | 210/130 |
| 4,212,739 | A | * | 7/1980 | Hilton et al. | 210/130 |
| 4,295,964 | A | * | 10/1981 | Preisler | 210/130 |
| 4,356,090 | A | * | 10/1982 | Tran | 210/350 |
| 4,385,913 | A | * | 5/1983 | Lane | 96/130 |
| 4,401,563 | A | * | 8/1983 | Koelfgen | 210/130 |
| 4,435,287 | A | * | 3/1984 | Sumimoto | 210/131 |
| 4,442,004 | A | * | 4/1984 | Smith et al. | 210/448 |
| 4,804,466 | A | * | 2/1989 | Cooper et al. | 210/316 |
| 4,869,820 | A | * | 9/1989 | Yee | 210/316 |
| 4,935,128 | A | * | 6/1990 | Hoeptner, III | 210/130 |
| 5,015,379 | A | * | 5/1991 | Drori | 210/411 |
| 5,122,264 | A | * | 6/1992 | Mohr et al. | 210/111 |
| 5,340,470 | A | * | 8/1994 | Hedrick et al. | 210/130 |
| 5,356,535 | A | * | 10/1994 | Ueno et al. | 210/416.5 |
| 5,462,678 | A | * | 10/1995 | Rosaen | 210/798 |
| 5,481,876 | A | * | 1/1996 | Bay et al. | 60/454 |
| 5,580,453 | A | * | 12/1996 | Nurse, Jr. | 210/323.2 |
| 5,600,954 | A | * | 2/1997 | Bay et al. | 60/454 |
| 5,628,916 | A | * | 5/1997 | Stevens et al. | 210/798 |
| 5,679,244 | A | * | 10/1997 | Tettman et al. | 210/130 |
| 5,795,472 | A | * | 8/1998 | Nurse, Jr. | 210/232 |
| 5,906,221 | A | * | 5/1999 | Mancell | 137/549 |
| 6,221,246 | B1 | * | 4/2001 | Shums | 210/248 |
| 6,224,754 | B1 | * | 5/2001 | Schiavon et al. | 210/130 |
| 6,299,762 | B1 | * | 10/2001 | Szabo et al. | 210/90 |
| 6,475,380 | B1 | * | 11/2002 | Fangmann et al. | 210/120 |
| 6,517,722 | B1 | * | 2/2003 | Benenson et al. | 210/323.2 |
| 6,568,550 | B2 | * | 5/2003 | Takiguchi | 220/4.01 |
| 6,605,210 | B2 | * | 8/2003 | Reinhardt | 210/130 |
| 6,666,976 | B2 | * | 12/2003 | Benenson et al. | 210/784 |
| 6,676,834 | B1 | * | 1/2004 | Benenson et al. | 210/323.2 |
| 6,712,981 | B2 | * | 3/2004 | Benenson et al. | 210/785 |
| 6,739,319 | B2 | * | 5/2004 | Braun et al. | 123/509 |
| 6,821,444 | B2 | * | 11/2004 | Benenson et al. | 210/785 |
| 6,861,004 | B2 | * | 3/2005 | Benenson et al. | 210/785 |
| 7,094,344 | B2 | * | 8/2006 | Shirakawa et al. | 210/301 |
| 2002/0170852 | A1 | * | 11/2002 | Reinhardt | 210/132 |
| 2003/0015537 | A1 | * | 1/2003 | Konja | 220/563 |
| 2005/0103700 | A1 | * | 5/2005 | Shirakawa et al. | 210/301 |
| 2007/0131606 | A1 | * | 6/2007 | Klein et al. | 210/418 |
| 2008/0237152 | A1 | * | 10/2008 | Benachenhou | 210/799 |

FOREIGN PATENT DOCUMENTS

| | | |
|---|---|---|
| JP | 11-190449 | 7/1999 |
| JP | 2002-13656 | 1/2002 |
| JP | 2005-282805 | 10/2005 |

* cited by examiner

CONSTRUCTION MACHINE HAVING WORKING OIL TANK WITH FILTER CASE

BACKGROUND OF THE INVENTION

1. Field of the Invention

The present invention relates to a construction machine provided with a working oil tank such as a hydraulic excavator.

2. Description of the Related Art

THE RELATED ART will be described taking a hydraulic excavator of a preferred example of the present invention as an example.

The hydraulic excavator is, as shown in FIG. 5, formed by rotatably mounting an upper rotating body 2 on a crawler type lower traveling body 1 and attaching a working attachment 3 to the upper rotating body 2.

The working attachment 3 is formed by a boom 4 freely raising and lowering, an arm 5 attached to an front end of the boom 4, a bucket 6 attached to a front end of the arm 5, a boom cylinder 7, an arm cylinder 8 and a bucket cylinder 9 serving as hydraulic actuators for driving the boom, the arm and the bucket.

FIG. 6 shows device arrangement of a part of the upper rotating body 2, and FIG. 7 is an enlarged view of a part of FIG. 6.

An engine 10 serving as a power source and a hydraulic pump 11 serving as a hydraulic source are installed in a rear part of an upper frame 12 serving as a base of the upper rotating body 2. On one of left and right sides (on the right side in an example of the figure) on the front side of the engine 10 and the hydraulic pump 11, are installed and laterally aligned a control valve 13 for controlling an action of the hydraulic actuator such as each of the hydraulic cylinders 7 to 9, and a working oil tank 14 for supplying working oil to the hydraulic actuator, with the control valve being placed on the outer side.

It should be noted that a guard cover 15 is openably attached to an end on the right side of the upper frame taking the front side as center. By opening the guard cover 15, maintenance of the control valve 13 is performed.

The control valve 13 is, as shown in FIG. 7, formed such that a plurality of main spools (one main spool is shown in the figure) 16 for controlling the working direction and speed on the basis of a lever operation for each actuator are built in one valve block 17 in a story shape.

In the control valve 13, the main spools 16 are provided in parallel with the working oil tank 14, that is, in the longitudinal direction, due to tube connection to each port or the like.

When there is a need for a so-called pressure compensating function for compensating an action pressure of the hydraulic actuator and ensuring a fixed operability irrespective of a change in load, a pressure compensating spool (also called as load sensing spool) 18 is provided at right angles with the main spool 16, that is, in the lateral direction.

In FIG. 7, the reference numeral 19 denotes a bolt for closing a take-in and take-out port for the pressure compensating spool 18. At the time of assembling a valve and at the time of maintenance, the pressure compensating spool 18 is attached to and detached from the valve block 17 in a state that the bolt 19 is removed.

Meanwhile, a configuration the working oil tank 14 as THE RELATED ART is shown in FIGS. 8 and 9.

The working oil tank 14 is formed such that a cylindrical filter case 21 having a bottom is attached within a tank main body 20, a return filter 22 is housed inside thereof, and return oil flowing from the hydraulic actuator through a plurality of return tubes 23 is filtered in the return filter 22, and then returned to the inside of the tank main body 20 by a return pipe 24 installed through a central part of a filter case bottom wall 21*a*.

The return filter 22 is disposed on the bottom wall 21*a* of the filter case 21 and held by a push spring 25.

In the figure, the reference numeral 26 denotes a suction filter for filtering feed oil and the reference numeral 27 denotes a suction tube.

In the tank structure, as THE RELATED ART, all the return tubes 23 are connected to the upper side than the return filter 22, that is, to an upper part of a filter case side wall 21*b*.

In the above configuration, a point that the control valve 13 and the working oil tank 14 are aligned is shown in Japanese Patent Laid-Open No. Hei11-190449, a control valve structure including the pressure compensating spool 18 is shown in Japanese Patent Laid-Open No. 2002-13656, and a configuration of the working oil tank 14 is shown in Japanese Patent Laid-Open No. 2005-282805.

When taking a device layout shown in FIGS. 6 and 7, at the time of maintenance of the control valve 13, the main spool 16 is easily attached and detached in the longitudinal direction due to spaces on both the front side and the rear side. However, since a left side space S which is on the working side for performing attachment and detachment of the pressure compensating spool 18 is closed by the working oil tank 14, it is difficult or impossible to perform an attachment and detachment work of the pressure compensating spool 18.

Therefore, at the time of maintenance, the entire control valve 13 has to be removed from the upper frame 12, and hence the work is very troublesome.

As countermeasures thereof, it is thought that (A) the working oil tank 14 is displaced to the inner side (the left side) and a sufficient working space is ensured between the working oil tank 14 and the control valve 13, and (B) the working oil tank 14 is downsized in the lateral direction.

However, it is difficult to realize the countermeasure (A) since in the hydraulic excavator, particularly a small excavator of small rotating type or the like, a device installation space is limited or the like.

It is also difficult to realize the countermeasure (B), since a tank capacity of the working oil tank 14 is decreased so that it is not possible to ensure a necessary amount of working oil.

It should be noted that a return structure of the filter case 21 or the like shown in FIGS. 8 and 9 is downsized (reduced in diameter) so that an effective capacity of the tank main body 20 is increased and hence the tank is downsized.

However, in the working oil tank 14 mentioned above, all the return tubes 23 are concentrated on and connected to the upper part of the side wall 21 of the filter case in an octopus shape. Therefore, in order to ensure a tube connection area, a perimeter of the filter case 21 has to be large. As a result, it is substantially impossible to reduce the diameter of the filter case 21, and hence it is actually difficult to downsize the tank.

SUMMARY OF THE INVENTION

It is an object of the present invention to provide a construction machine capable of downsizing a working oil tank so as to ensure a sufficient working space for attaching and detaching a spool between the working oil tank and a control valve and also ensuring a necessary tank capacity under the condition that the control valve and the working oil tank are installed in line with each other and a part disturbed by a tank at the time of attachment and detachment thereof (a pressure compensating spool in the above example) is built in the control valve, or a construction machine provided with a working oil tank capable of avoiding direct contact of return oil with a side surface of a filter, separately connecting return tubes to a filter case and easing restrictions on a combination of the return tubes so as to simplify a connection structure.

Firstly, the construction machine according to the present invention has the following basic configuration.

The present invention is a construction machine, comprising a control valve for controlling an action of a hydraulic actuator, a working oil tank installed in line with the control valve, a filter case in which a return filter for filtering return oil is housed, the filter case being provided within a tank main body of the working oil tank, and a plurality of return tubes connected to a filter case side wall, wherein a surface of the tank main body of the working oil tank opposing to the control valve is inwardly dented so that between both the working oil tank and the control valve, is formed a working space which is necessary for attaching and detaching a part of the control valve, while the return tubes are separately connected to the upper side and the lower side of the filter case side wall.

According to the present invention, the surface of the tank main body of the working oil tank opposing to the valve is inwardly dented so that between the tank and the control valve, is formed a working space which is necessary for attaching and detaching a part of the control valve. Therefore, it is possible to easily attach and detach the object part due to the working space.

Further, since the return tubes are separately connected to the upper side and the lower side of the filter case, the filter case is downsized (reduced in diameter) so that an effective capacity of the tank main body is increased. Therefore, it is possible to cover the surface opposing to the valve which is dented in order to ensure the working space so as to ensure a necessary tank capacity.

The return tubes are separated to the upper side and the lower side so that the restrictions on a combination of the return tubes are eased. Therefore, a shape of the return tubes and the connection structure are simplified and it is advantageous in terms of a manufacturing property and cost. An effect at this point is remarkable in a small tank mounted in a small excavator.

Meanwhile, since the return oil is introduced and filtered from both the upper side and the lower side of the return filter, it is possible to widely use a filtering surface of the filter. Therefore, it is possible to improve the life of the filter.

The present invention is a construction machine having a working oil tank, the working oil tank comprising a cylindrical filter case having a bottom in which a return filter for filtering return oil is housed, the filter case being provided within the tank main body in which working oil is stored a plurality of return tubes connected to a filter case side wall in a state of communicating with the inside of the filter case, wherein a filter receiving plate is provided in a lower part within the filter case with leaving a gap between the filter receiving plate and a filter case bottom wall, the return filter is provided on the filter receiving plate and at least one of the return tubes is connected to the filter case side wall on the lower side than the filter receiving plate.

According to the present invention, since the filter receiving plate is provided in the lower part within the filter case and the filter is installed in a state that the filter is suspended apart from the case bottom wall, it is possible to connect a part of the return tubes to the lower part of the case. That is, it is possible to separately connect the return tubes to the lower part and the upper part of the filter case while avoiding the direct contact of the return oil to the side surface of the filter.

Further, it is only necessary to extend the filter case in the height direction. There is no need for enlarging the filter case and the tank main body in the radial direction.

By this, the restrictions on a combination of the return tubes are eased. Therefore, the shape of the return tubes and the connection structure are simplified and it is advantageous in terms of the manufacturing property and cost. An effect at this point is remarkable in the small tank mounted in the small excavator. Alternatively, since the tank can be downsized, it is possible to reduce a space occupied by the tank.

Since the return oil can be introduced and filtered from both the upper side and the lower side of the return filter, it is possible to widely use the filtering surface of the filter. Therefore, it is possible to improve the life of the filter.

DESCRIPTION OF THE PREFERRED EMBODIMENTS

A description will be given to an embodiment of the present invention on the basis of FIGS. 1 to 4 and properly with reference to FIGS. 5 to 9 for comparative explanation or the like. In the embodiment, a hydraulic excavator is taken as an example of an object to which the present invention is applied.

Figure 1:
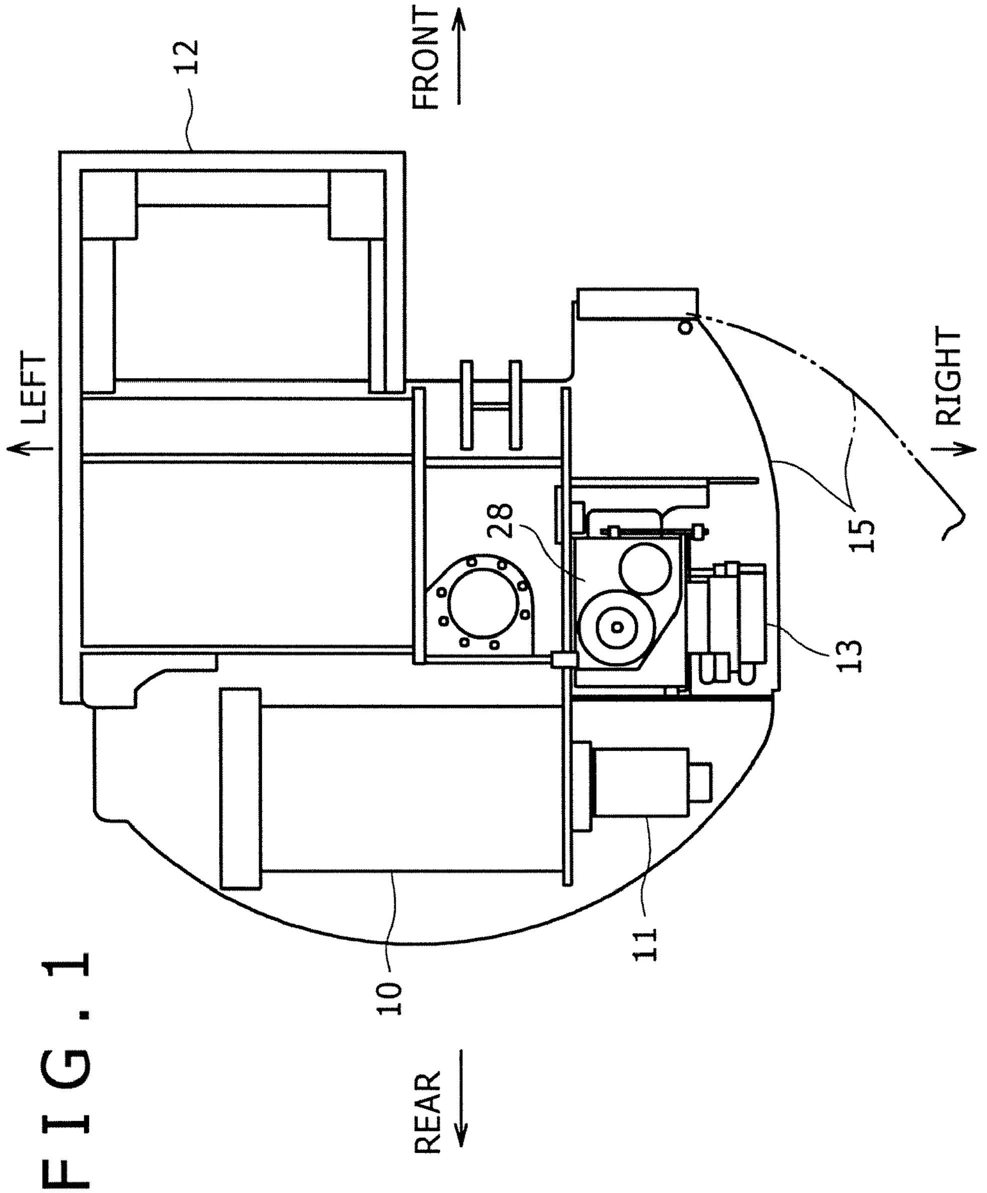
FIG. 1 is a schematic plan view showing device arrangement of a part of an upper frame of a hydraulic excavator according to an embodiment of the present invention.
Figure 2:
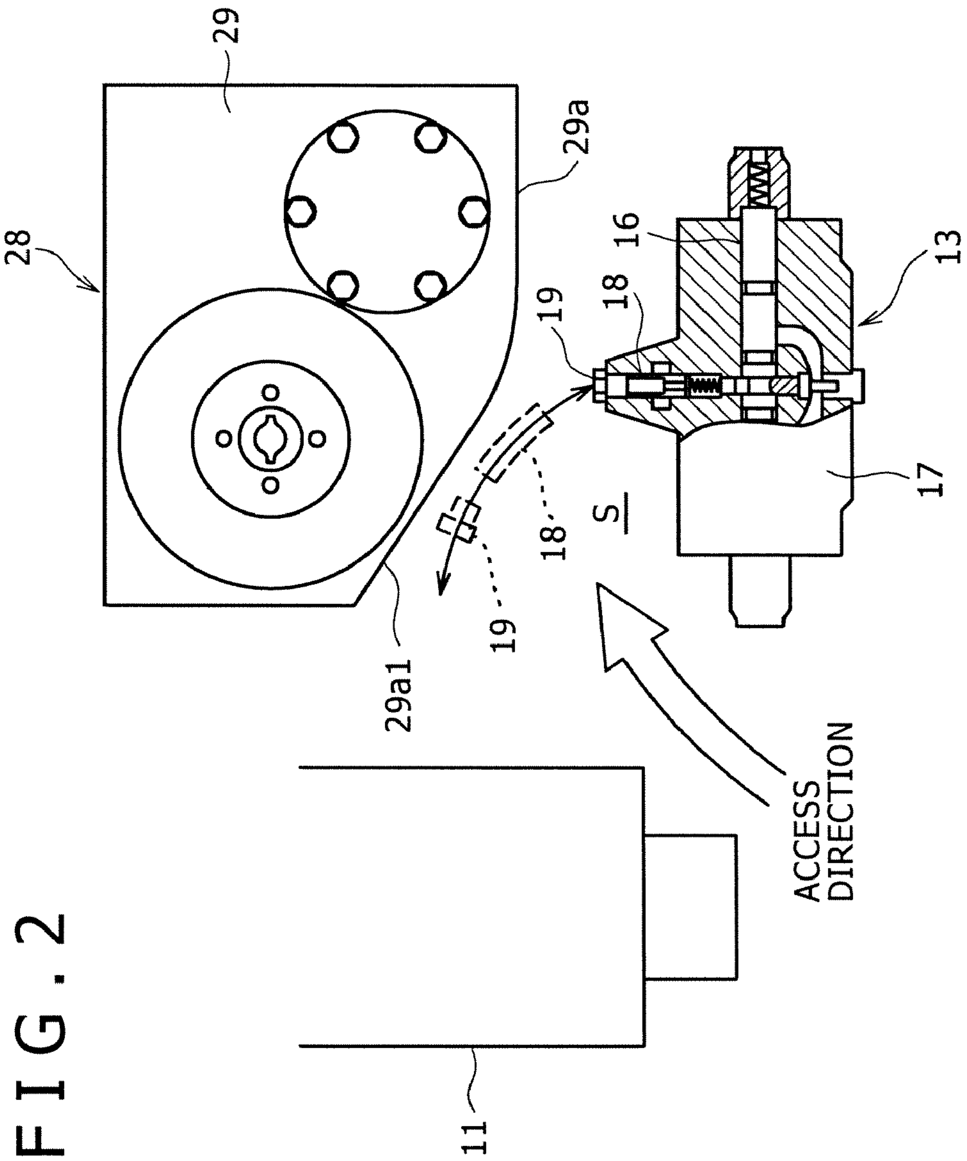
FIG. 2 is an enlarged view showing a part of FIG. 1.
Figure 6:
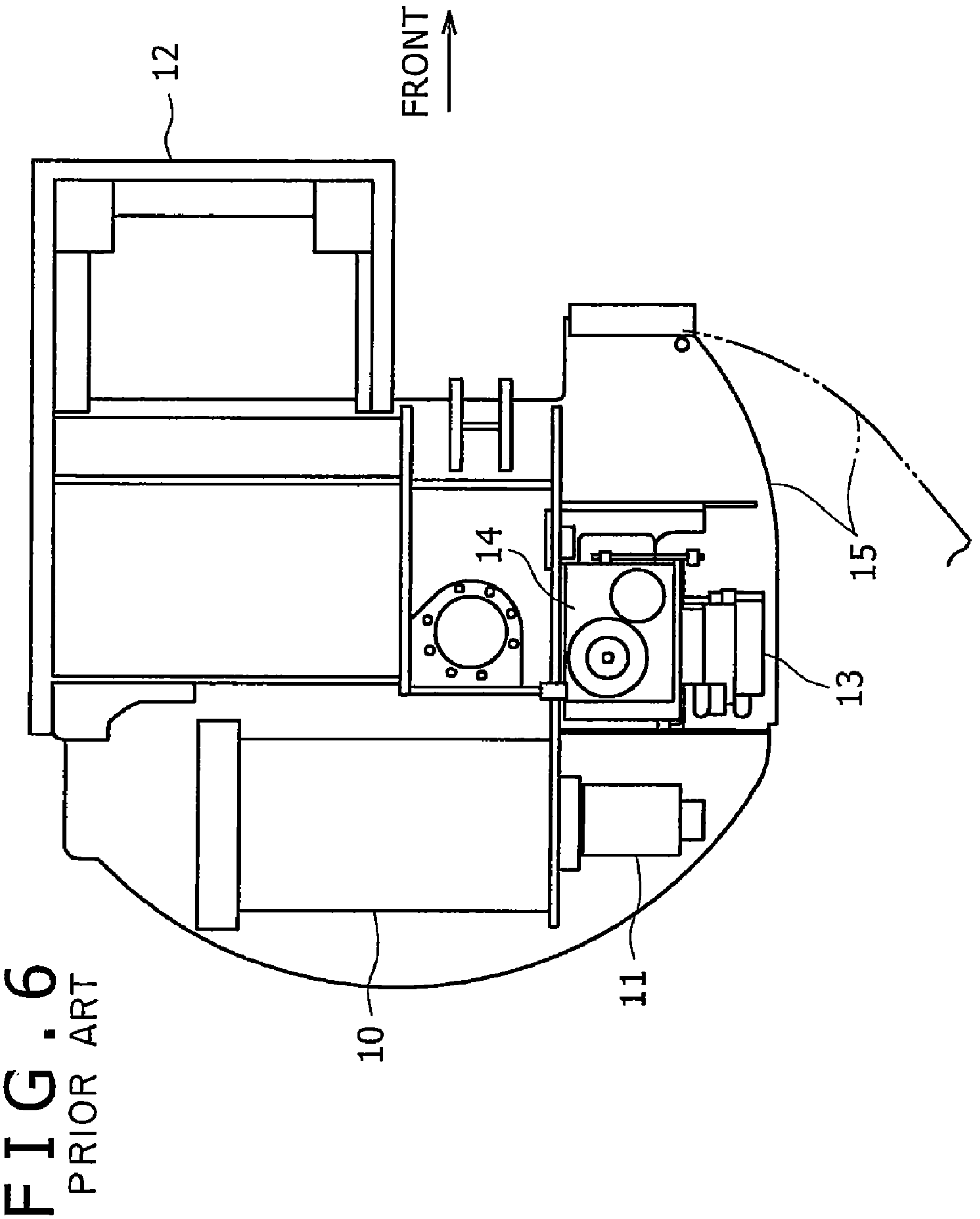
FIG. 6 PRIOR ART
FIG. 6 is a view corresponding to FIG. 1 for explaining THE RELATED ART.
Figure 7:
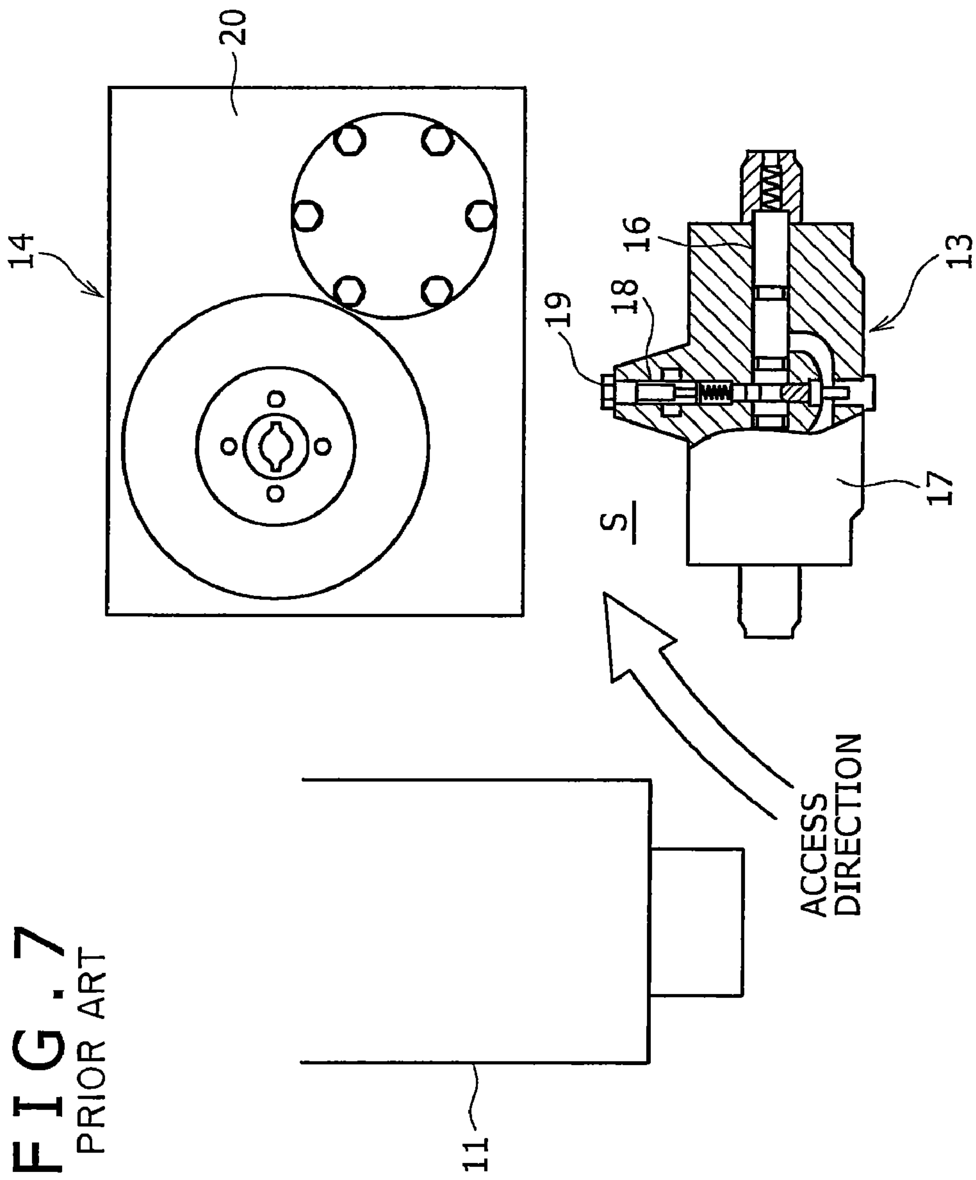
FIG. 7 PRIOR ART
FIG. 7 is a view corresponding to FIG. 2 for explaining THE RELATED ART.

FIGS. 1 and 2 show device arrangement of a part of an upper frame 12, and correspond to THE RELATED ART shown in FIGS. 6 and 7.

A basic configuration of the embodiment is as follows.

(i) In a rear part of the upper frame 12, are installed an engine 10 and a hydraulic pump 11. On the front side of the engine 10 and the hydraulic pump 11 on the right side, are laterally aligned a control valve 13 and a working oil tank 28.

(ii) In an end on the right side of the upper frame 12, is openably attached a guard cover 15 taking the front side as center. By opening the guard cover 15, maintenance of the control valve 13 and the working oil tank 28 is performed.

(iii) The control valve 13 is formed such that a plurality of main spools 16 (only one main spool is shown in the figure) are built in one valve block 17 in a story shape.

(iv) The main spools 16 are provided in parallel with the working oil tank 28 (in the longitudinal direction).

(v) A pressure compensating spool 18 is provided so as to be orthogonal to the main spool 16, and in a state that a bolt 19 is removed, the spool 18 is attached and detached due to a working space S between the control valve 13 and the working oil tank 28.

Figure 3:
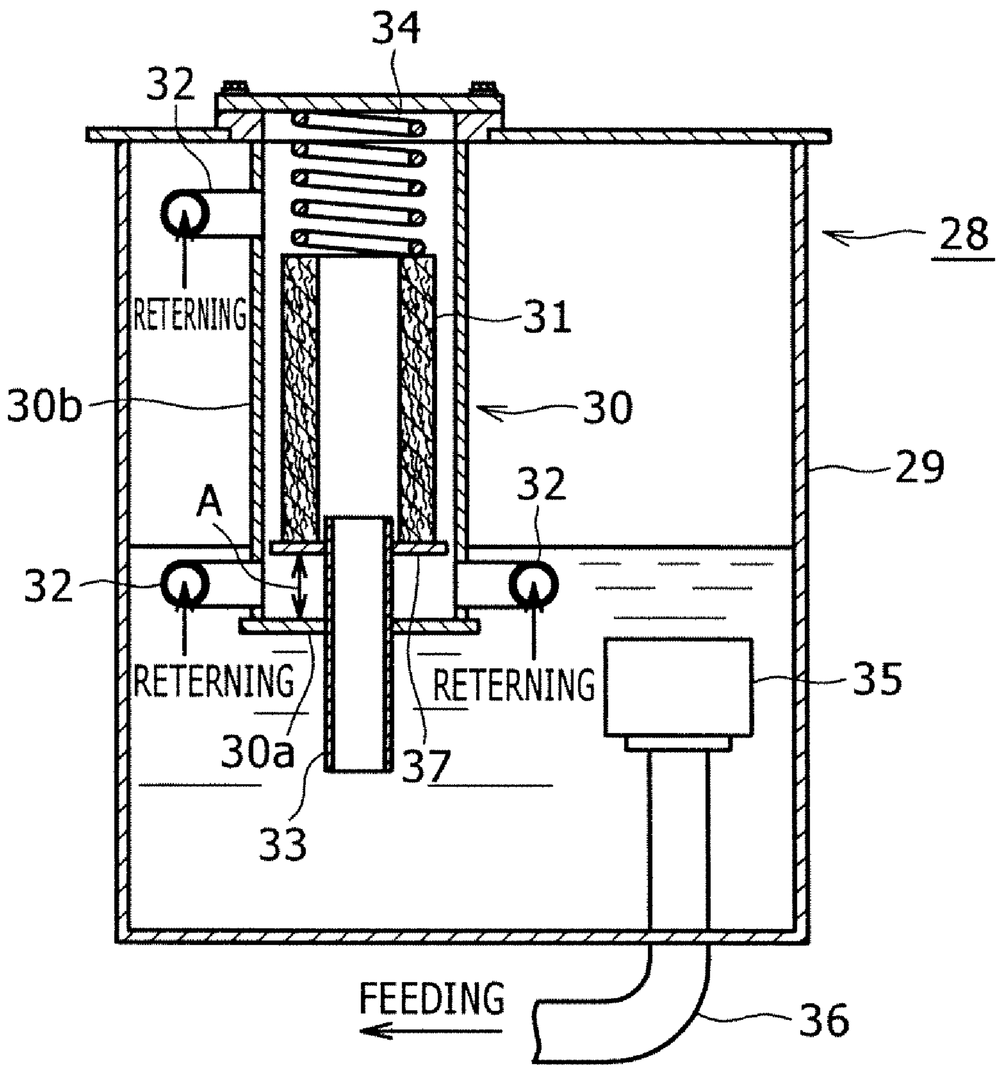
FIG. 3 is a sectional view of a working oil tank in FIG. 2.
Figure 4:
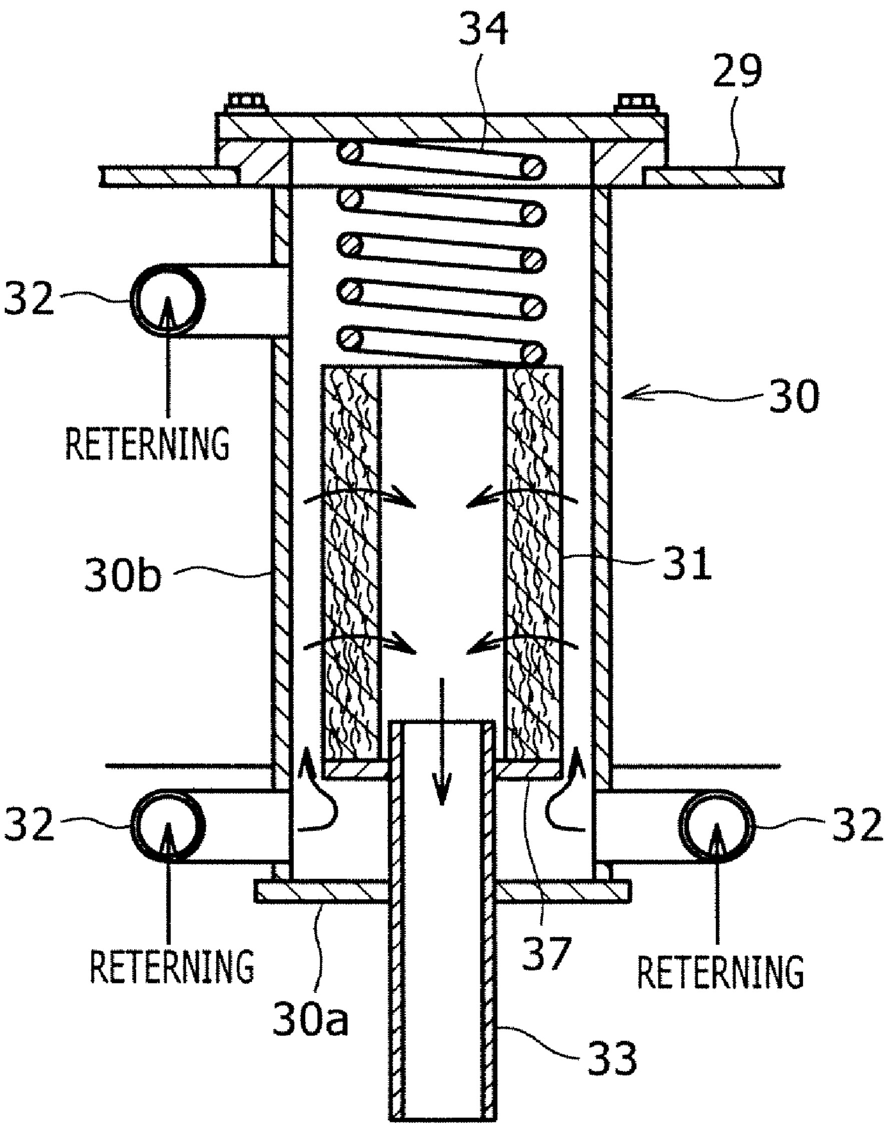
FIG. 4 is an enlarged view of a part of FIG. 3.
Figure 5:
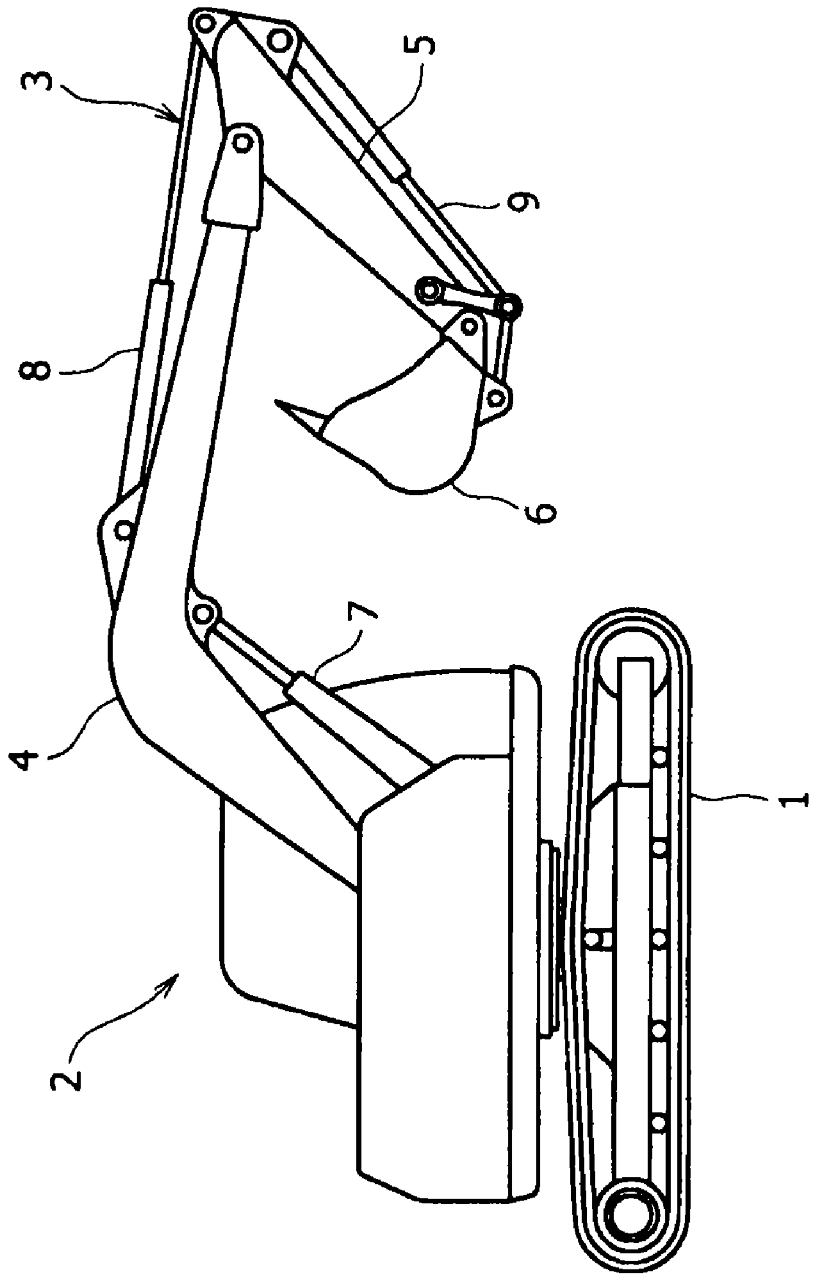
FIG. 5 (PRIOR ART)
FIG. 5 is a schematic side view of a hydraulic excavator of a preferred example of the present invention.
Figure 8:
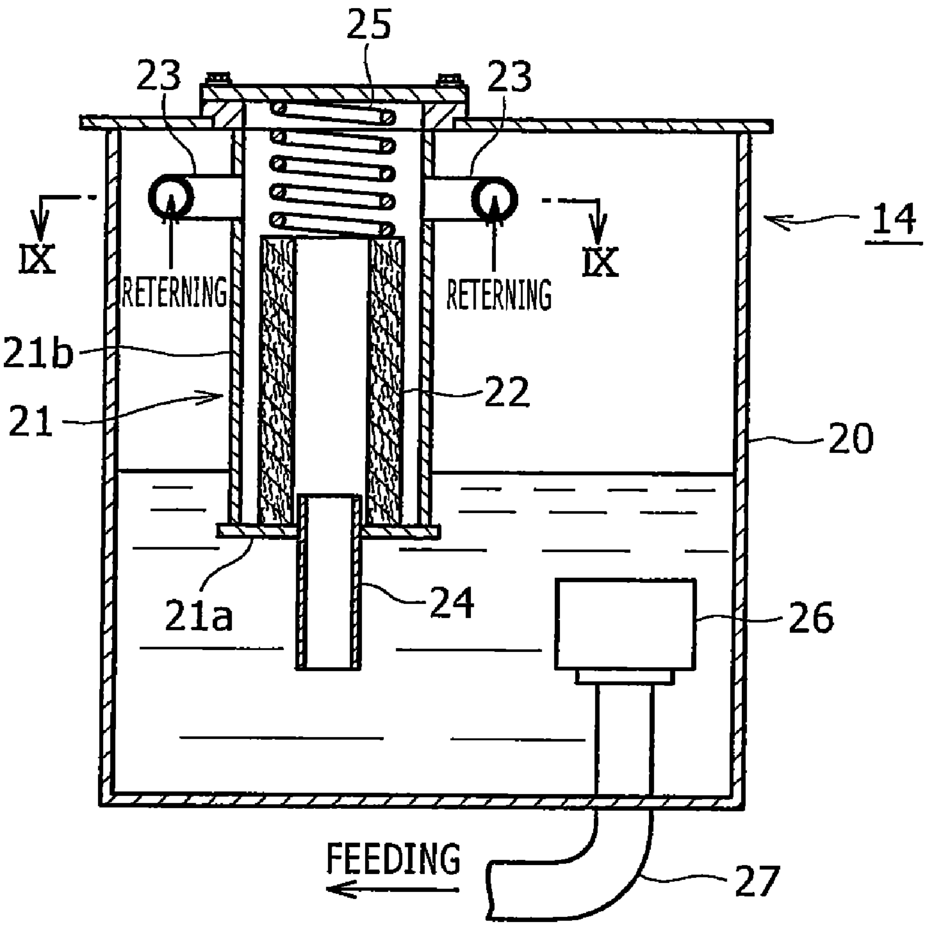
FIG. 8 PRIOR ART
FIG. 8 is a sectional view of the working oil tank as THE RELATED ART.
Figure 9:
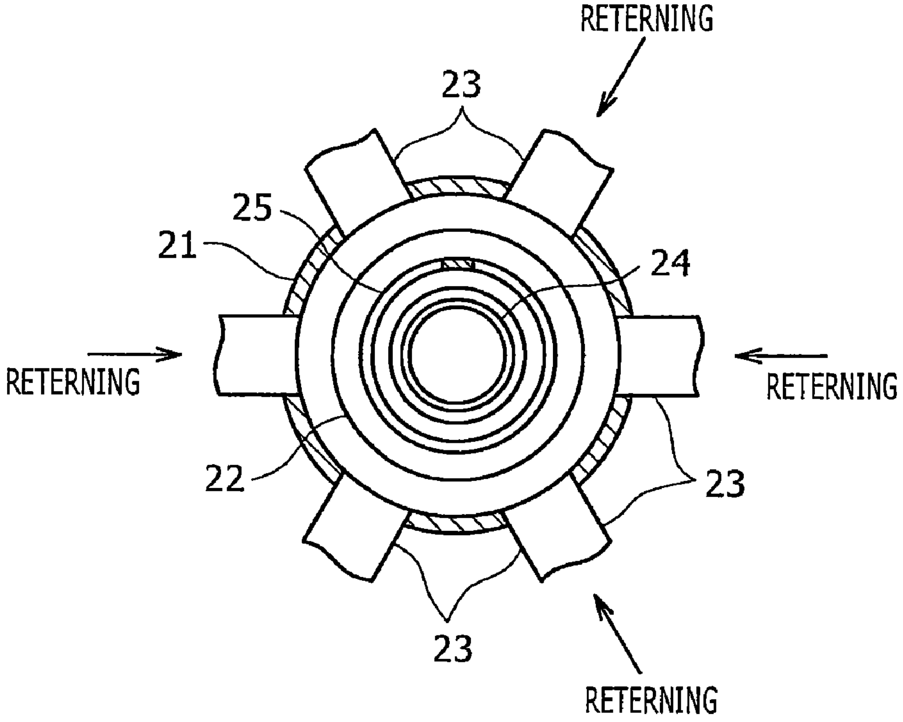
FIG. 9 PRIOR ART
FIG. 9 is an enlarged sectional view by line IX-IX of FIG. 8.

Meanwhile, FIGS. 3 and 4 showing a configuration of the working oil tank 28 correspond to THE RELATED ART shown in FIGS. 8 and 9.

A basic configuration of the working oil tank 28 is the same as THE RELATED ART. The working oil tank 28 is formed such that a cylindrical filter case 30 having a bottom is attached within a tank main body 29, a return filter 31 is housed inside thereof, and return oil flowing from the hydraulic actuator through a plurality of return tubes 32 is filtered in the return filter 31, and then returned to the inside of the tank main body 29 by a return pipe 33 installed through a central part of a filter case bottom wall 30*a*.

The return filter 31 is disposed on the bottom wall 30*a* of the filter case 30 and held by a push spring 34. In the figure, the reference numeral 35 denotes a suction filter for filtering feed oil and the reference numeral 36 denotes a suction tube.

In the present embodiment, as a different point from THE RELATED ART, there is firstly a point that a rear half part of a surface (right side surface) 29*a* of the tank main body 29 of the working oil tank 28 opposing to the control valve 13, that is, a part 29*a*1 forming the working space S which is necessary for attaching and detaching the pressure compensating spool 18 is dented in an inclining surface shape in the direction moving away from the control valve 13 (inward). Therefore, the working space S is formed so as to gradually spread towards the rear side.

By this, as understood by comparison with FIG. 7, the working space S is enlarged to the inner side than THE RELATED ART and as shown by an imaginary line in FIG. 2, it is possible to attach and detach the bolt 19 and the pressure compensating spool 18 in the enlarged working space S.

In other words, the rear half part 29*a*1 of the right side surface of the tank main body 29 is dented so as to form the working space S which is necessary and sufficient for attaching and detaching the pressure compensating spool 18 between the control valve 13 and the working oil tank 28.

By this, without enlarging a gap between the control valve 13 and the working oil tank 28 and removing the control valve 13, it is possible to easily and efficiently perform a maintenance work of the pressure compensating spool 18.

The entire right side surface 29*a* of the tank main body 29 is not dented, but only the rear half part 29*a*1 which disturbs the attachment and the detachment of the pressure compensating spool 18 is dented. Further, the rear half part 29*a*1 is not dented in a concave shape but inclined in the direction moving away from the control valve 13. Therefore, it is possible to minimize a decrease in a capacity of the tank main body 29 due to the dent, while ensuring an extent which is necessary for the working space S.

Further, in the present embodiment, in order to cover a decreased amount of the tank capacity mentioned above, the working oil tank 28 is formed as follows.

As shown in FIGS. 3 and 4, a filter receiving plate 37 is provided in a lower part within the filter case 30 with leaving a gap A (refer to FIG. 3) between the filter receiving plate 37 and the filter case bottom wall 30*a*. The return filter 31 is disposed on the filter receiving plate 37, pushed and held by a push spring 34.

The filter receiving plate 37 is attached to an upper end of the return pipe 33 passing through the filter case bottle wall 30*a* in a state that a central part thereof is passed through by the pipe 33. At least one of the return tubes 32 (two return tubes in an example of the figure) is connected to a lower part of a filter case side wall 30*b* on the lower side than the filter receiving plate 37 (within a range of the gap A).

In other words, a part which is capable of connecting tubes is also formed in the lower part of the filter case side wall 30*b*, and the return tubes 32 are separately connected to an upper part and the lower part of the filter case side wall 30*b*.

According to the above configuration, in comparison to the case where all the return tubes 23 are concentrated on and connected to the upper part of the filter case side wall 21*b* in an octopus shape as in THE RELATED ART shown in FIGS. 8 and 9, it is possible to shorten a perimeter of the filter case 30 which is necessary for the above tube connection.

Therefore, it is possible to reduce the diameter of the filter case 30 and hence enlarge an effective capacity of the tank main body 30 so as to cover a dented part of the right side surface 20*a*, that is, to ensure a necessary tank capacity.

Since the return tubes 32 are separated into the upper side and the lower side, the restrictions on a combination of the return tubes 32 are eased. Therefore, a shape of the return tubes 32 and the connection structure are simplified and it is advantageous in terms of a manufacturing property and cost. An effect at this point is remarkable in a small tank mounted in a small excavator.

Meanwhile, since the return oil is introduced and filtered from both the upper side and the lower side of the return filter 31, it is possible to widely use a filtering surface of the filter 31. Therefore, it is possible to improve the life of the filter 31.

Further, the return pipe 33 originally provided in the tank 28 is slightly extended and the filter receiving plate 37 is supported by the pipe 33. Therefore, there is no need for adding an exclusive member for supporting the plate 37. Consequently, it is advantageous in simplification of the tank structure and there is no fear that flow of the working oil is disturbed within the filter case 30.

Even on the premise of the tank structure of THE RELATED ART shown in FIGS. 8 and 9, it is possible to connect a part of the return tubes 32 to the lower part of the filter case side wall 30*b*. However by this, the return oil from lower tubes (particularly high pressure oil of a main tube) is brought into direct contact with a side surface of the filter and hence there is fear that the filtering surface (a filter paper) is damaged by pressure thereof.

With regard to this point, in the present embodiment, since the filter receiving plate 37 is provided in the lower part within the filter case 30 and the filter 31 is installed in a state that the filter 31 is suspended apart from the case bottom wall 30*a*, it is possible to connect the return tubes 32 to the lower part of the case while avoiding the direct contact of the return oil with the filter side surface.

In other words, it is possible to separately connect the return tubes 32 to the upper side and the lower side without adverse effects that the filter side surface is damaged by the direct contact of the return oil and a complicated structure of attaching a baffle plate is required in order to avoid the above damage.

Other Embodiments (1) A support structure of the filter receiving plate 37 may be changed to other structure such as a structure that a supporting member having rough mesh is provided between the plate 37 and the filter case bottom wall 30*a*.

Alternatively, as is the return structure of THE RELATED ART shown in FIGS. 8 and 9, the return tubes 32 may be separated into the upper side and the lower side and connected to the filter case 30. In this case, the direct contact of the return oil with the lower side surface of the filter 31 may be avoided by a known baffle plate.

(2) In accordance with a positional relationship between the working oil tank 28 and the control valve 13, an intermediate part in the longitudinal direction of the surface 29*a* of the tank main body 29 opposing to the valve may be dented in a concave shape seen from the top at a part thereof in the valve height direction or a part thereof of overall height.

(3) In the above embodiment, the description is given to the case where the pressure compensating spool 18 and the bolt 19 are to be attached and detached. However, in the case where a part such as other spool whose attachment and detachment are disturbed by the working oil tank 28 as well as the spool 18 is provided in the control valve 13, a necessary part of the tank main body 29 may be dented taking the above part as the object part.

(4) A construction machine provided with the following working oil tank is preferable. The cylindrical filter case 30 having a bottom is attached within the tank main body 29, the return filter 31 is housed inside thereof, and the return oil flowing from the hydraulic actuator through a plurality of the return tubes 32 is filtered in the return filter 31, and then returned to the inside of the tank main body 29 by the return pipe 33 provided in a central part of the filter case bottom wall 30*a*.

The reference numeral 34 denotes a push spring for pushing the return filter 31 downward, the reference numeral 35 denotes a suction filter for filtering the feed oil and the reference numeral 36 denotes a suction tube.

In the above working oil tank, the filter receiving plate 37 is provided in the lower part within the filter case 30 with leaving the gap A (refer to FIG. 3) between the filter receiving plate 37 and the filter case bottom wall 30*a*. The return filter 31 is disposed on the filter receiving plate 37, pushed and held by the push spring 34.

The filter receiving plate 37 is attached to the upper end of the return pipe 33 passing through the filter case bottle wall 30*a* in a state that the central part thereof is passed through by the pipe 33. At least one of the return tubes 32 (two return tubes in an example of the figure) is connected to the lower part of the filter case side wall 30*b* on the lower side than the filter receiving plate 37 (within a range of the gap A).

In other words, the tube connection part in which the return oil is not brought into direct contact with the filter side surface is also formed in the lower part of the filter case side wall 30*b*, and the return tubes 32 are separately connected to the upper part and the lower part of the filter case side wall 30*b*.

According to the above configuration, in comparison to the case where all the return tubes 23 are concentrated on and connected to the upper part of the filter case side wall 21*b* in an octopus shape as in THE RELATED ART shown in FIGS. 8 and 9, in the present invention, since the return tubes 32 are separated into the upper side and the lower side, it is possible to drastically ease the restrictions on a combination of the return tubes, and connect each of the return tubes 32 by selecting a position to which each of the return tubes 32 is more easily connected among the upper side and the lower side. Therefore, it is possible to simplify the shape of the tubes and the tube structure.

Further, it is only necessary to extend the filter case 30 for the gap A in the height direction. There is no need for enlarging the filter case 30 and the tank main body 29 in the horizontal direction.

Therefore, it is easy to assemble the tank and a manufacturing property of the tank is dramatically improved. An effect at this point is particularly remarkable in a small tank in which a connection area for the return tubes 32 is limited, and it is highly advantageous for a small construction machine in which it is difficult to increase size of the tank.

Alternatively, it is possible to downsize the tank instead of an assembling property. By this, since a space occupied by the tank is reduced, it is also advantageous for the small construction machine.

Since the return oil is introduced and filtered from both the upper side and the lower side of the return filter 31, it is possible to widely use the filtering surface of the filter 31. Therefore, it is possible to improve the life of the filter 31.

Meanwhile, the return pipe 33 originally provided in the tank is slightly extended and the filter receiving plate 37 is supported by the pipe 33. Therefore, there is no need for adding an exclusive member for supporting the plate 37. Consequently, it is advantageous in simplification of the tank structure, and there is no fear that the flow of the working oil within the filter case 30 is disturbed.

It should be noted that the support structure of the filter receiving plate 37 may be changed to other structure such as a structure that the supporting member having rough mesh is provided between the plate 37 and the filter case bottom wall 30*a*.

Although the invention has been described with reference to the preferred embodiments in the attached figures, it is noted that equivalents may be employed and substitutions made herein without departing from the scope of the invention as recited in the claims.

I claim:

1. A construction machine having a working oil tank, said working oil tank comprising:
- a tank main body defining complementary compartments, said complementary compartments comprising:
  - an outer compartment for storing working oil; and,
  - an inner compartment for filtering return oil, and wherein said inner compartment is a cylindrical filter case comprising:
    - a bottom wall;
    - a side wall;
    - a return filter for filtering return oil above said bottom wall and inside said side wall;
    - a filter receiving plate provided in a lower part within said filter case, wherein said return filter is disposed on and above said filter receiving plate which defines an upper space above said return filter within said inner compartment, and said filter receiving plate is located above said bottom wall of said filter case which defines a continuous lower gap between said filter receiving plate and said bottom wall of said filter case; and,
    - wherein said bottom wall and said side wall partition said outer compartment from said inner compartment;
- a plurality of return tubes connected to said side wall of said filter case for returning working oil from said outer compartment to said inner compartment, said return tubes including an upper tube and a lower tube; and,
- wherein said lower tube is connected to said side wall of said filter case below said filter receiving plate so as to communicate with said continuous lower gap, while said upper tube is connected to said side wall of said filter case above said return filter so as to communicate with said upper space.

2. The construction machine having said working oil tank according to claim 1, wherein said working oil tank, when seen in a plan view, is generally rectangular with a dent portion at a corner of said working oil tank such that a capacity of said working oil tank is reduced as compared to a second capacity of a second tank lacking said dent portion.

3. The construction machine having said working oil tank according to claim 1, further comprising a return pipe having a first open end positioned in said cylindrical filter case at a position for receiving oil that has been filtered by said return filter, and a second open end located in said outer compartment at a position for discharging oil that has been filtered by said return filter to said working oil stored in said outer compartment.

* * * * *